US009536276B2

(12) United States Patent
Pendluru et al.

(10) Patent No.: US 9,536,276 B2
(45) Date of Patent: Jan. 3, 2017

(54) METHOD OF SUBMITTING GRAPHICS WORKLOADS AND HANDLING DROPPED WORKLOADS

(71) Applicant: Intel Corporation, Santa Clara, CA (US)

(72) Inventors: Nishanth Reddy Pendluru, Folsom, CA (US); Jeffrey S. Frizzell, Folsom, CA (US); Ankur N. Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 14/318,893

(22) Filed: Jun. 30, 2014

(65) Prior Publication Data

US 2015/0379667 A1    Dec. 31, 2015

(51) Int. Cl.
| | |
|---|---|
| G06T 1/00 | (2006.01) |
| G06T 1/20 | (2006.01) |
| G09G 5/00 | (2006.01) |
| G09G 5/14 | (2006.01) |
| G09G 5/36 | (2006.01) |

(52) U.S. Cl.
CPC ............... *G06T 1/20* (2013.01); *G09G 5/006* (2013.01); *G09G 5/14* (2013.01); *G09G 5/363* (2013.01); *G09G 2340/02* (2013.01); *G09G 2360/08* (2013.01); *G09G 2360/121* (2013.01)

(58) Field of Classification Search
None
See application file for complete search history.

(56) References Cited

U.S. PATENT DOCUMENTS

| | | | |
|---|---|---|---|
| 2009/0160867 A1* | 6/2009 | Grossman | G06T 15/005 345/522 |
| 2011/0208921 A1* | 8/2011 | Pohlack | G06F 9/467 711/147 |
| 2012/0147021 A1* | 6/2012 | Cheng | G06F 9/545 345/522 |
| 2013/0159664 A1* | 6/2013 | Blinzer | G06F 9/3004 711/207 |
| 2013/0229421 A1* | 9/2013 | Cheng | G06T 1/20 345/522 |
| 2014/0026137 A1* | 1/2014 | Vembu | G06F 9/4881 718/102 |

* cited by examiner

*Primary Examiner* — Peter Hoang
(74) *Attorney, Agent, or Firm* — Forefront IP Lawgroup of Christie and Rivera, PLLC

(57) ABSTRACT

Described herein are technologies related to performing of a preemption operation in graphics hardware. Particularly, the preemption operation includes tracking of unreported or dropped workload independent of workloads submitted to the graphics hardware.

19 Claims, 10 Drawing Sheets

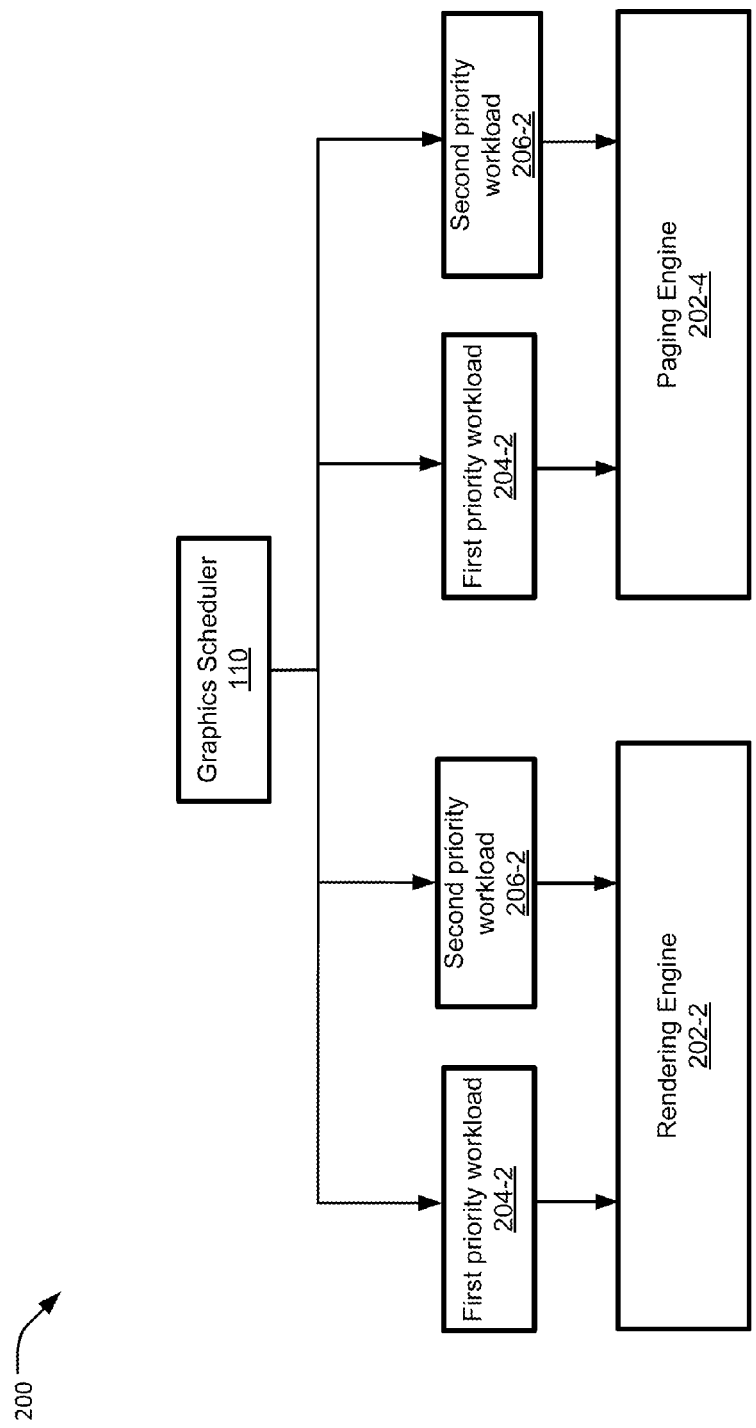

METHOD OF SUBMITTING GRAPHICS WORKLOADS AND HANDLING DROPPED WORKLOADS

BACKGROUND

Graphics subsystem hardware in a computing device may include several independent graphic engines such as a rendering engine, paging engine, display engine, and the like. A software algorithm implemented as a graphics scheduler may be utilized to schedule the graphics engines to execute multiple graphics workloads, which are executed on graphics hardware.

When the graphics scheduler is executed, for example, by a central processing unit (CPU) of the computing device, the execution of the graphics scheduler on the CPU may impose significant latency overhead due to communication delays between the graphic engines and the CPU. Furthermore, a typical tracking of unreported or dropped workload through full scanning of memory registers may add additional latency overhead.

BRIEF DESCRIPTION OF THE DRAWINGS

FIG. 2 illustrates an example overall view of a submit queue (i.e., priority list) and its relation to graphic engines of a graphics hardware.

DETAILED DESCRIPTION

Described herein are systems and methods for performing a preemption operation in graphics hardware. For example, the performing of the preemption operation includes: receiving and loading of at least two workloads; processing the at least two workloads; interrupting the processing of the two workloads by a processing of a high priority workload; tracking an unreported or dropped (i.e., unprocessed) workload due to the interruption; and determining whether a new workload is received and loaded, wherein the tracked unreported or dropped workload is re-queued after the new workload in response to the determination of receiving and loading of the new workload.

Figure 1:
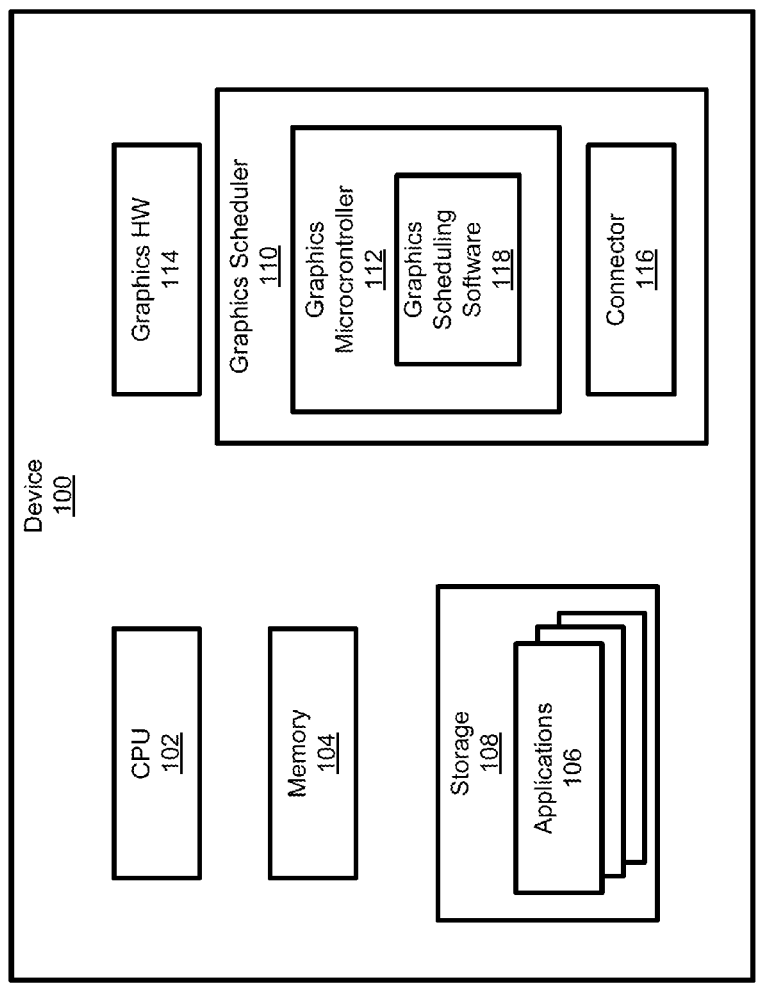
FIG. 1 illustrates an example block diagram of a computing device used in accordance with implementations described herein

FIG. 1 is an example block diagram of a computing device 100 that may be used in accordance with implementations described herein. The computing device 100 may include a control processing unit (CPU) 102, a memory device 104, applications 106, storage 108, a graphics scheduler 110, graphics microcontroller 112, graphics hardware 114, connector 116, and graphics scheduling software 118.

Example computing device 100 may be a laptop computer, desktop computer, tablet computer, mobile device, or server, among others. In this example, the computing device 100 may include the CPU 102 configured to execute stored instructions, as well as the memory device 104 that stores instructions, which are executable by the CPU 102. The CPU 102 may control and coordinate the overall operations of the computing device 100. Furthermore, the CPLU 102 may be a single core processor, a multi-core processor, a computing cluster, or any number of other configurations.

In an implementation, the memory device 104 may include a main memory of the computing device 100. In addition, the memory device 104 may include any form of random access memory (RAM), read-only memory (ROM), flash memory, or the like. For example, the memory device 104 may be one or more banks of memory chips or integrated circuits. In this example, the CPU 102 may have direct access to the memory device 104 through a bus connection (not shown).

The instructions that are executed by the CPU 102 may be used to execute any of a number of applications 106 residing within the storage device 108 of the computing device 100. The applications 106 may be any type of applications or programs having graphics, graphics objects, graphics images, graphics frames, video, or the like, to be displayed to a user (not shown) of the computing device 100. The storage device 108 may include a hard drive, an optical drive, a thumb drive, an array of drives, or any combinations thereof.

The CPU 102 may furthermore be linked through the bus to the graphics scheduler 110. For example, the graphics scheduler 110 may be configured to perform scheduling operations for the applications 106 executing on the CPU 102. In this example, the graphics scheduler 110 may include the graphics microcontroller 112. The graphics microcontroller 112, for example, may be configured to perform scheduling operations for the graphics hardware 114.

In an implementation, the graphics microcontroller 112 interfaces with the graphics hardware 114 via the connector 116. For example, the connector 116 may be configured to receive interrupts and other messages from the graphics hardware 114, and forwards such interrupts and other messages to the graphics microcontroller 112. In this example, a direct scheduling of the tasks, or workload queues, requested by the applications 106 may be implemented with little input from the CPU 102. Thus, the delay and the power consumption for scheduling the graphics tasks may be lower than the delay and the power consumption associated with direct scheduling algorithms and decisions being executed on the CPU 102 for scheduling graphics tasks.

In an implementation, the graphics microcontroller 112 may include the graphics scheduling software 118. In this implementation, the graphics scheduling software 118 may be loaded into the hardware of the computing device 100 via a graphics driver (not shown) shortly after the boot-up phase of the computing device 100. The graphics driver may be included within a graphics subsystem of the computing device 100, and may include a system software.

It is to be understood that the described block diagram of FIG. 1 may include other additional components not shown in the computing device 100.

FIG. 2 is an example overall view 200 of a submit queue (i.e., priority list) and its relation to graphic engines of the graphics hardware 114.

In graphics processors, the graphics workload contexts may be submitted in a batch of two graphic workload contexts atomically. However, when a first graphic workload is preempted, the other second graphic context may be dropped due to graphics hardware behavior. Furthermore, the second graphic workload may not be reported as dropped because the graphics hardware did not have knowledge of its presence in the submit queue. To this end, the implementations described herein provides a way to trace back and account for the silently dropped graphic workload as this graphic workload needs to be re-submitted later for another chance to get processed. Furthermore, the re-submitting of the graphic workload in the submit queue is independent of current status of the already submitted graphic workload in the graphics hardware 114.

In an implementation, the graphics hardware 114 may include a number of graphics engines 202 such as a rendering engine 202-2, a paging engine 202-4, a video engine (not shown), a blitter engine (not shown), etc. Each of the graphics engines 202 may be configured to perform specific graphics tasks, or to execute specific types of workloads. For example, the rendering engine 202-2 processes a first set of first priority workload 204-2 and a second priority workload 206-2 while the paging engine 202-4 processes a second set of first priority workload 204-2 and second priority workload 206-2. In this example, the graphics engine 202 workload submission architecture includes multiple submit queues for every engine.

For example, the first set of first priority workload 204-2 and the second priority workload 206-2 are for regular or normal submission while the second set is for higher priority submissions that need to be nm as soon as possible. Other queues (not shown) are variations of these two priorities.

With continuing reference to FIG. 2, the graphics hardware 114 may include a display engine (not shown) that is configured to display data to the user of the computing device 100. For example, the display engine displays the data that is rendered by one or more of the graphics engines 202. Furthermore, the graphics engines 202 and the display engine may be configured to send event notifications about executing graphic workloads to the graphics microcontroller 112.

Figures 3A, 3B:
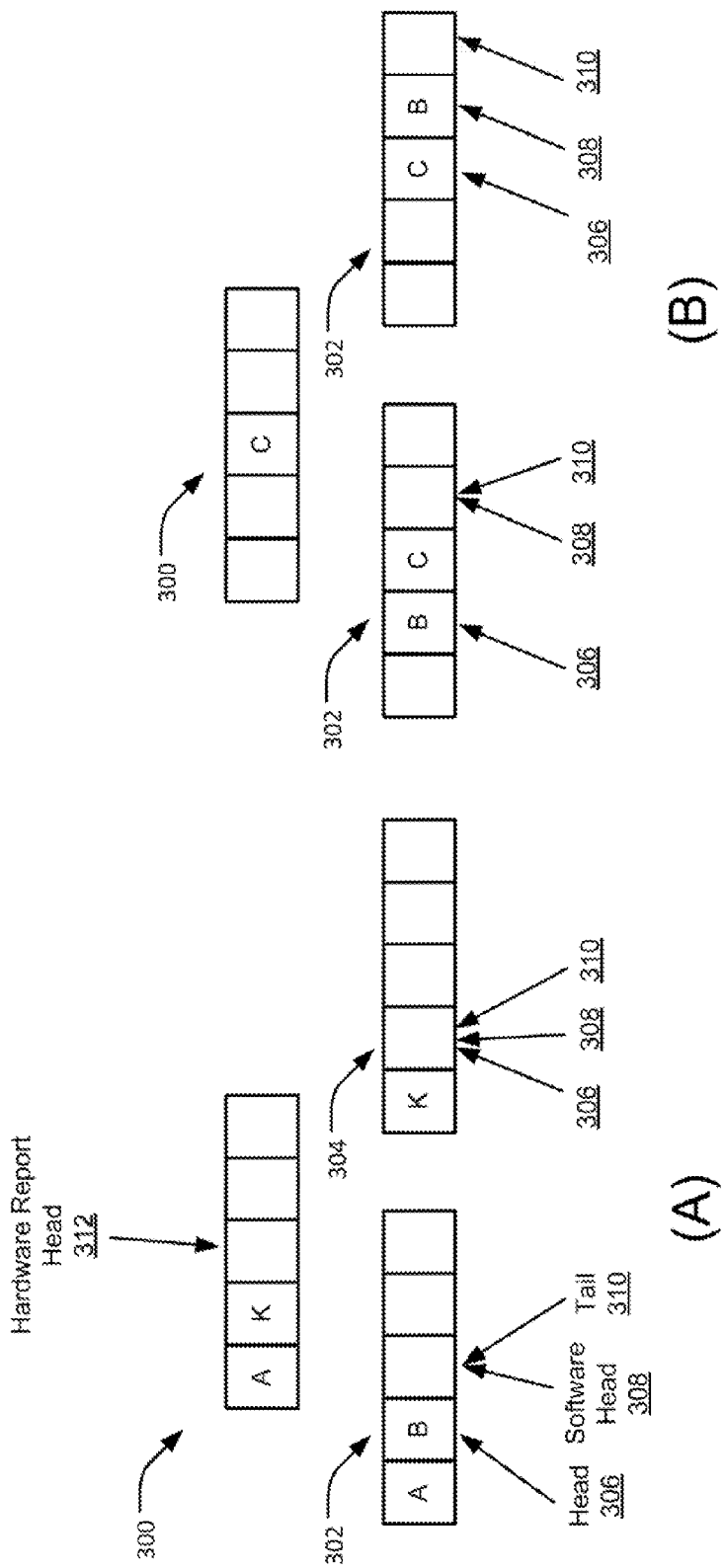
FIGS. 3A and 3B illustrate an example solution for managing a dropped or preempted workload in an example submit queue.

FIGS. 3A and 3B illustrate an example solution for managing a dropped or preempted workload in an example submit queue. The example solution is implemented, for example, through a software algorithm (i.e., applications 106) stored in the computing device.

FIG. 3A shows a hardware context status report 300, submit queue 302 and a preemptive submit queue 304. Submit queue 304 may be a queue that holds high priority workloads. Furthermore, FIG. 3A shows a head 306, software head 308, tail 310, and a hardware report head 312. The head 306, for example, includes the workload that has been submitted to the graphic hardware. Software head 308 indicates workload to be submitted to the graphic hardware. If software head 308 is at the same location as tail 310, this indicates that no more work is to be submitted. If head 306 is the same location as software head 308, then no work has been submitted to the graphic hardware from submit queue 302. There is no need to perform a full or partial scan to determine the workload that is dropped because the head 306 in the submit queue 302 may indicate that it has not yet received any report from the hardware context status report 300. On the other hand, the software head 308 may indicate the next workload or next entry to be submitted to the graphics hardware.

When a workload defined by a context identification (ID) is submitted and added, for example, to the submit queue 302 or the preempt submit queue 304, the tail pointer value of tail 310 changes to point to the next entry in a circular queue buffer. In this example, when the workload is submitted to the graphics hardware engine 202, the workload is taken from the register pointed at by the software head 308. The workload that is completed and acknowledged by the graphics hardware is reported in the hardware context status report 300, which is a context status buffer report register. In an implementation, the hardware context status report 300 has context status entries (for example 64 bits) that include the context ID of the workload that was submitted. In this implementation, the graphics microcontroller 112 resolves which submit queue the context ID belongs to by looking at other bits in the context status buffer entry. For example, the context ID entry may indicate whether the workload was completed already, preempted or in waiting state.

If the workload was completed already (e.g., workload A in the submit queue 302), the head 306 in the submit queue 302 is moved by a "de-queue" operation in the software algorithm. However, if the workload was preempted or was in waiting state (e.g., workload K interrupts workloads A and B), then the entry (i.e., preempted workload B) in the submit queue 302 is de-queued and then immediately re-queued at the end of the submit queue 302 so that the dropped workload B will have another chance to run again.

The context status buffer records any time the hardware engine 202 switches to a different context. For example, when the hardware engine 202 switches away from executing one context and/or starts executing some context, the hardware engine 202 writes information into a context status buffer to indicate what happened. For example, what type operations that have occurred. This includes bits to indicate the following:

a) engine which was previously idle (not processing any context) has started processing some workload
b) context went to idle state because it switched away from the previously active context for some reason and no other work was pending
c) engine switched away from processing workload for one context and started processing another.
d) in either b or c, the engine also writes the context id of the context that it switched away from as well as bits indicating the reason for the switch.

Such reasons may include the following:
i) Workload ran to completion
ii) Workload was preempted
iii) Workload was switched out due to unsatisfied dependency check on memory semaphore or display event After the hardware engine 202 writes a context status entry the hardware engine 202 sends an interrupt to the microcontroller 112 telling the microcontroller 112 something happened. The microcontroller 112 reads the context status buffer entries to analyze what happened in order to disposition the submit queue entry associated with the context that was switched away from.

To do so, the microcontroller 112 uses the uses information encoded in the context ID field of the context status record to quickly and efficiently determine which submit queue that context was submitted from. This tells the microcontroller 112 which submit queue the microcontroller 112 will have to do queue maintenance on (e.g., update head, re-queue incomplete or preempted work for later resubmission).

FIG. 3B shows an example scenario when a new workload C is introduced after a previous preemption. As shown, in order to track unreported or dropped workload, the head (pointer) 306 is utilized to identify the unreported or dropped workload and re-queue the unreported or dropped workload at the end of the submit queue 302.

For example, a currently submitted workloads A and B. In this example, assume that the workload B is yet to be acknowledged by graphics hardware due to another workload K that causes a preemption and dropping of the workload B. Because the workloads A and K were already completed, these workloads may be removed from the submit queue 302. However, when the new workload C is introduced or submitted to the submit queue 302, the head 306 is still pointing at the workload B indicating that the workload B has yet to be reported. In this case, the new workload C is acknowledged, and then initially there will not be a match with hardware report. Thus, the workload B is re-queued at the end of the submit queue 302 in order to have this previously unreported or dropped workload to get a chance to run again. It is noted, that at the point at which to determine to clean up dropped entries is an optimization and may change based on workload heuristics.

Figure 4:
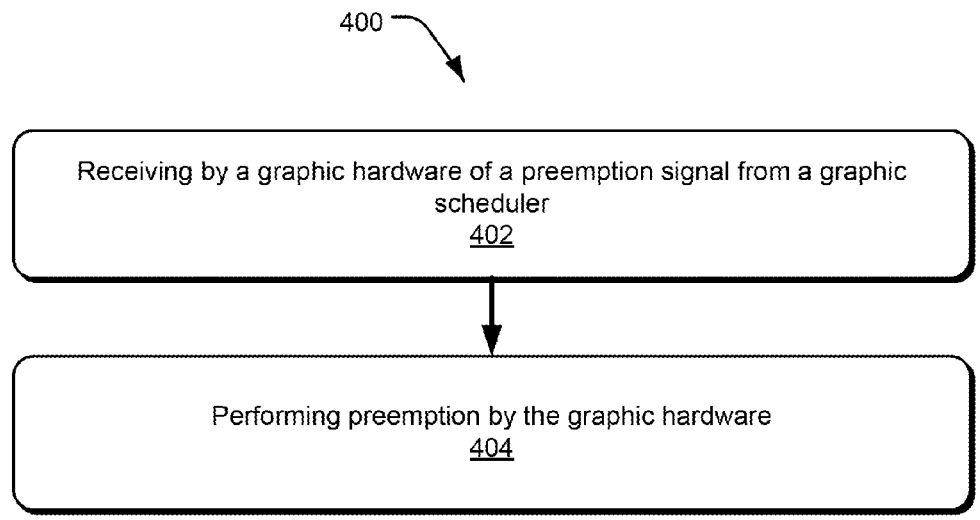
FIG. 4 illustrates an example flowchart for performing scheduling operations for the graphics hardware.

FIG. 4 shows an example process flowchart 400 illustrating an example method for performing scheduling operations for the graphics hardware. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, a request for preemption is sent from the graphics scheduler 110 to graphics engine 202 which may be busy executing another workload. In this example, the preemption signal includes workloads which were delivered to the graphics scheduler 110 from workload queues of applications 106 executing in the CPU 102. Each of the workload queues may include a number of workloads (e.g., workloads A, B, C, etc.) that relate to graphic tasks to be performed. For example, graphic tasks may include rendering graphics data to produce graphic images or displaying graphics images to a user of the computing device 100. The graphic images may include pixel images, encoded images, video images or frames, static images, photo images, animated images, and the like.

In an implementation, the graphics scheduler 110 is configured to perform scheduling operations independent of the CPU 102. In this implementation, the performing of the scheduling operations for graphics engines 202 may include determining which particular graphics engine 202 executes each of the workloads, and determining an order of executing workloads for each graphics engine 202.

At block 404, performing preemption by the graphics hardware is performed. For example, the graphics engines 202 of the graphics hardware 114 are configured to implement processing and tracking of unreported or dropped workload as discussed in FIGS. 3A and 3B above.

Figure 5:
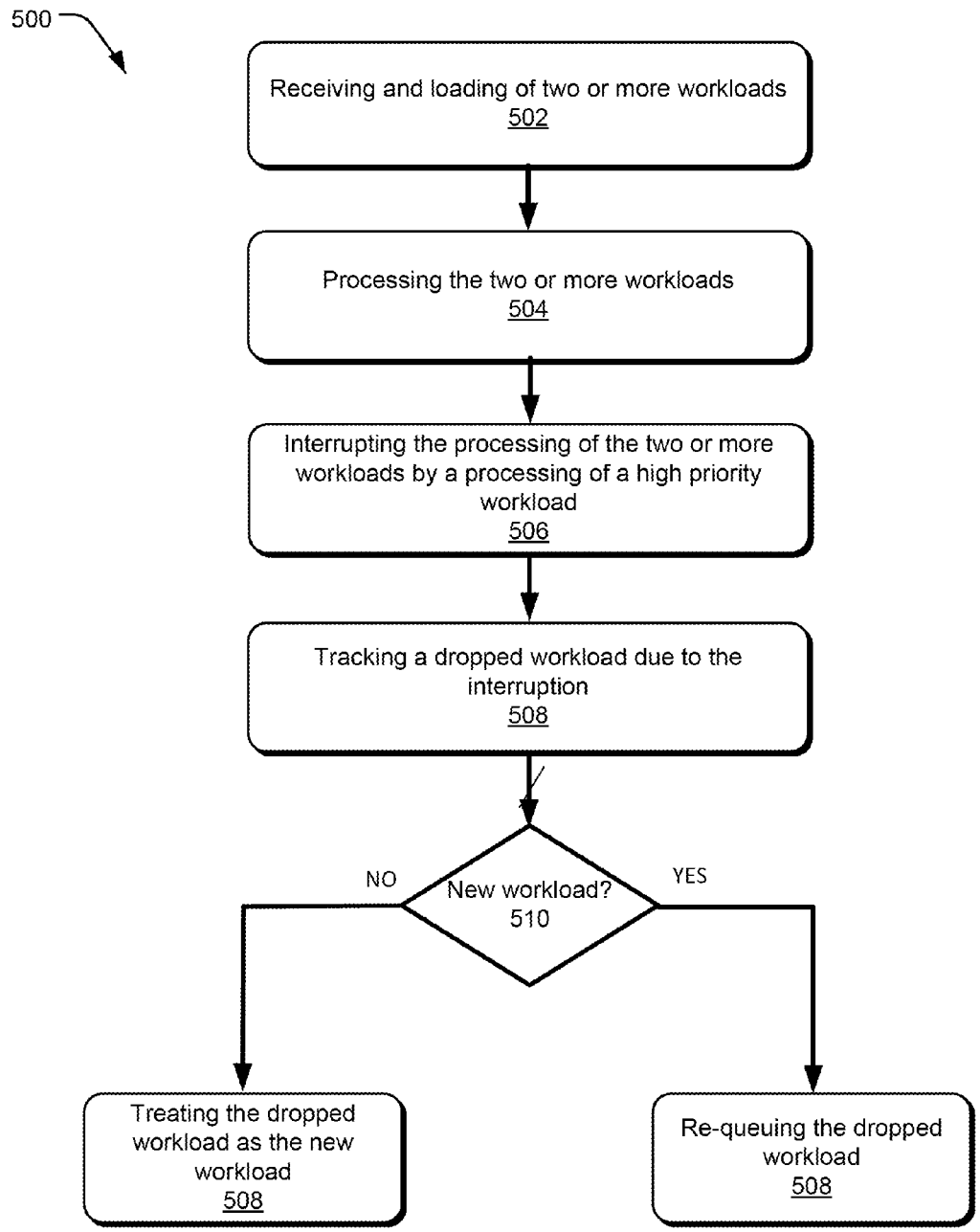
FIG. 5 illustrates an example flowchart of tracking unreported or dropped workload during workload processing.

FIG. 5 shows an example process flowchart 500 illustrating an example method of tracking unreported or dropped workload during workload processing. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

Graphics hardware supports submitting workloads A and B together atomically to a graphics engine 202, such that if workload A finishes the graphics engine 202 may immediately start working on workload B without waiting for a graphics scheduler 110 intervention. This may improve throughput versus submitting a single context at a time. However, a potential race condition may occur. For example, the graphics scheduler 110 may make a decision to submit a preemption request with workload K. The preemption request may arrive and is processed while the graphics engine 202 is still processing workload. Although the graphics engine 202 is processing workload A, workload A is preempted and needs to be re-queued. The context status buffer would indicate that A was preempted.

Alternatively, the case may be that by that by the time the preemption request is seen by the graphics engine 202, the graphics engine 202 may have already switched to workload B (workload A has completed) and workload B is the one that will get preempted. In this case the context status buffer will have two records, one record indicating a switch from workload A to workload B, due to workload A completing, and another record indicating that workload B was preempted. In this case workload B is re-queued.

In other cases, the time the preemption request is seen, the hardware engine 202 may have completed both workload A and workload B (or otherwise switched away from both). In such cases, context status will show that workload A and workload B are both complete, which indicates no preemption and thus no re-queue.

The graphics scheduler 110 reads the context status to determine which of these cases applies so that the graphics scheduler 110 may know which workloads/contexts need to be re-queued. It is to be noted, that in the case where workload K preempts workload A, workload B is not seen in the context status buffer at all because the graphics engine 202 never started processing that workload. On completion of K, the graphics hardware 114 does not automatically resume workload A or workload B. Since workload B does not appear in the context status report, workload B may be considered as "dropped" or "unreported". This is a case that should be handled, and graphics scheduler 110 may re-queue both workload A and workload B in such a case.

At block 502, receiving and loading of two or more workloads is performed. For example, a submit queue register 302 receives and loads the workloads A and B atomically. In this example, the workloads A and B are defined by their corresponding context IDs.

At block 504, processing the two or more workloads is performed. For example, the graphic engine 202 is configured to execute the processing of the workloads A and B.

At block 506, interrupting the processing of the two or more workloads by a processing of a high priority workload is performed. For example, the graphics scheduler 110 decides to send the preemption signal and as such, the current processing in the graphic engine 202 is interrupted by the processing, for example, of the high priority workload "K."

At block 508, tracking a dropped workload due to the interruption is performed. For example, the tracking of the dropped workload may be performed by checking the contents of the hardware context status report 300 and comparing these contents to the current workloads in the submit queue register 302. In this example, the hardware context status report 300 indicates which workload has been completed, dropped, or unreported.

As such, any workload shown in the submit queue register 302 that does not appear at the hardware context status report 300 is deemed to be incomplete, dropped, or never reported to the graphics hardware for processing.

At block 510, determining if a new workload is received and loaded in the submit queue is performed. For example, if a new workload C is received and loaded in the submit queue 302, the tracked dropped workload is re-queued after the new workload C so that the dropped workload may have a chance to run again. Otherwise, if there is no new workload that is received and loaded in the submit queue, the graphics scheduler 110 may request the graphics engine 202 to process the tracked dropped workload.

Figure 6:
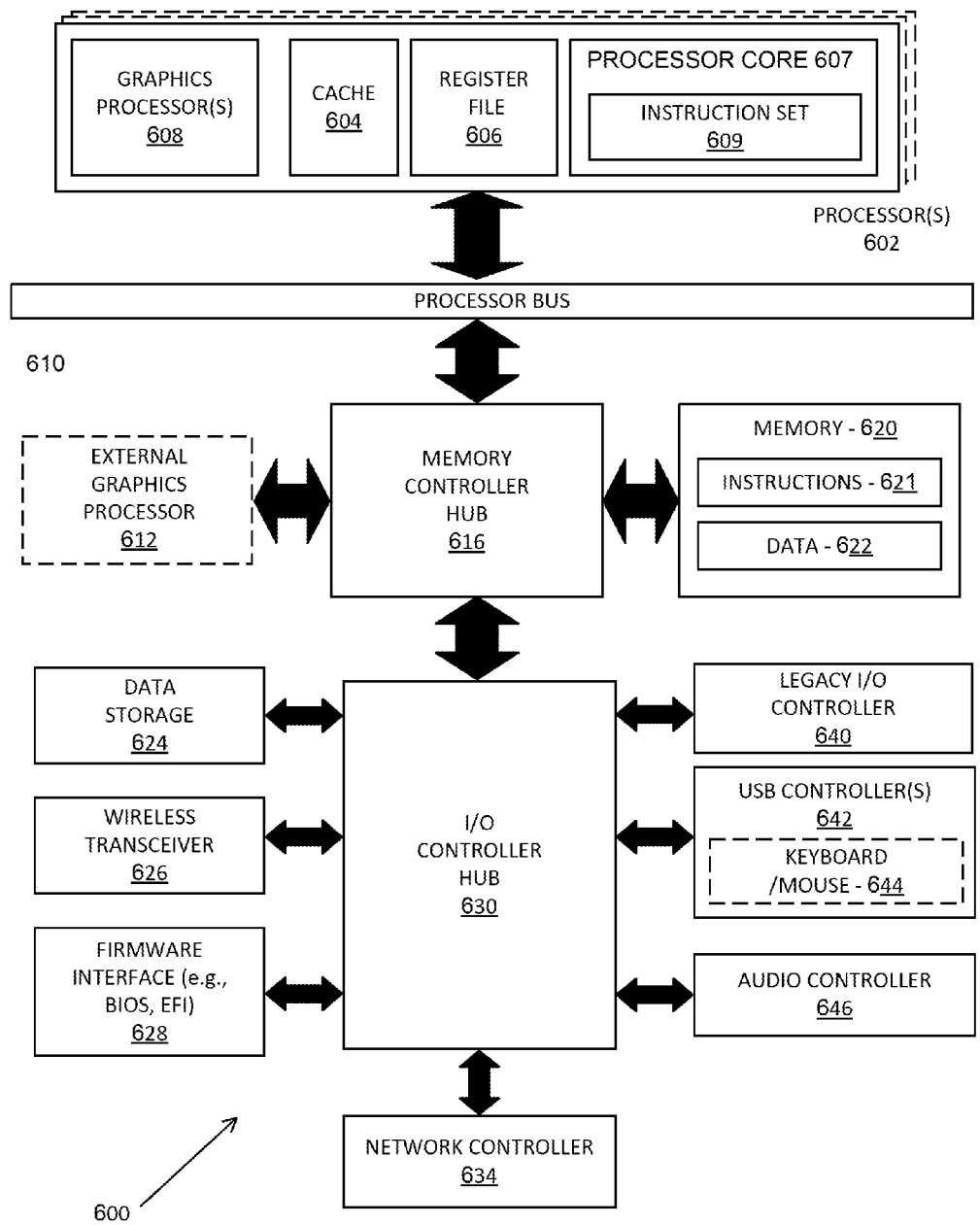
FIG. 6 is a block diagram of a data processing system according to an embodiment.

FIG. 6 is a block diagram of a data processing system 600, according to an embodiment. The data processing system 600 includes one or more processors 602 and one or more graphics processors 608, and may be a single processor desktop system, a multiprocessor workstation system, or a server system having a large number of processors 602 or processor cores 607. In on embodiment, the data processing system 600 is a system on a chip integrated circuit (SOC) for use in mobile, handheld, or embedded devices.

An embodiment of the data processing system 600 can include, or be incorporated within a server-based gaming platform, a game console, including a game and media console, a mobile gaming console, a handheld game console, or an online game console. In one embodiment, the data processing system 600 is a mobile phone, smart phone, tablet computing device or mobile Internet device. The data processing system 600 can also include, couple with, or be integrated within a wearable device, such as a smart watch wearable device, smart eyewear device, augmented reality device, or virtual reality device. In one embodiment, the data processing system 600 is a television or set top box device having one or more processors 602 and a graphical interface generated by one or more graphics processors 608.

The one or more processors 602 each include one or more processor cores 607 to process instructions which, when executed, perform operations for system and user software. In one embodiment, each of the one or more processor cores 607 is configured to process a specific instruction set 609. The instruction set 609 may facilitate complex instruction set computing (CISC), reduced instruction set computing (RISC), or computing via a very long instruction word (VLIW). Multiple processor cores 607 may each process a different instruction set 609 which may include instructions to facilitate the emulation of other instruction sets. A processor core 607 may also include other processing devices, such a digital signal processor (DSP).

In one embodiment, the processor 602 includes cache memory 604. Depending on the architecture, the processor 602 can have a single internal cache or multiple levels of internal cache. In one embodiment, the cache memory is shared among various components of the processor 602. In one embodiment, the processor 602 also uses an external cache (e.g., a Level 3 (L3) cache or last level cache (LLC)) (not shown) which may be shared among the processor cores 607 using known cache coherency techniques. A register file 606 is additionally included in the processor 602 which may include different types of registers for storing different types of data (e.g., integer registers, floating point registers, status registers, and an instruction pointer register). Some registers may be general-purpose registers, while other registers may be specific to the design of the processor 602.

The processor 602 is coupled to a processor bus 610 to transmit data signals between the processor 602 and other components in the system 600. The system 600 uses an exemplary 'hub' system architecture, including a memory controller hub 616 and an input output (I/O) controller hub 630. The memory controller hub 616 facilitates communication between a memory device and other components of the system 600, while the I/O controller hub (ICH) 630 provides connections to I/O devices via a local I/O bus.

The memory device 620, can be a dynamic random access memory (DRAM) device, a static random access memory (SRAM) device, flash memory device, or some other memory device having suitable performance to serve as process memory. The memory 620 can store data 622 and instructions 621 for use when the processor 602 executes a process. The memory controller hub 616 also couples with an optional external graphics processor 612, which may communicate with the one or more graphics processors 608 in the processors 602 to perform graphics and media operations.

The ICH 630 enables peripherals to connect to the memory 620 and processor 602 via a high-speed I/O bus. The I/O peripherals include an audio controller 646, a firmware interface 628, a wireless transceiver 626 (e.g., Wi-Fi, Bluetooth), a data storage device 624 (e.g., hard disk drive, flash memory, etc.), and a legacy I/O controller for coupling legacy (e.g., Personal System 2 (PS/2)) devices to the system. One or more Universal Serial Bus (USB) controllers 642 connect input devices, such as keyboard and mouse 644 combinations. A network controller 634 may also couple to the ICH 630. In one embodiment, a high-performance network controller (not shown) couples to the processor bus 610.

Figure 7:
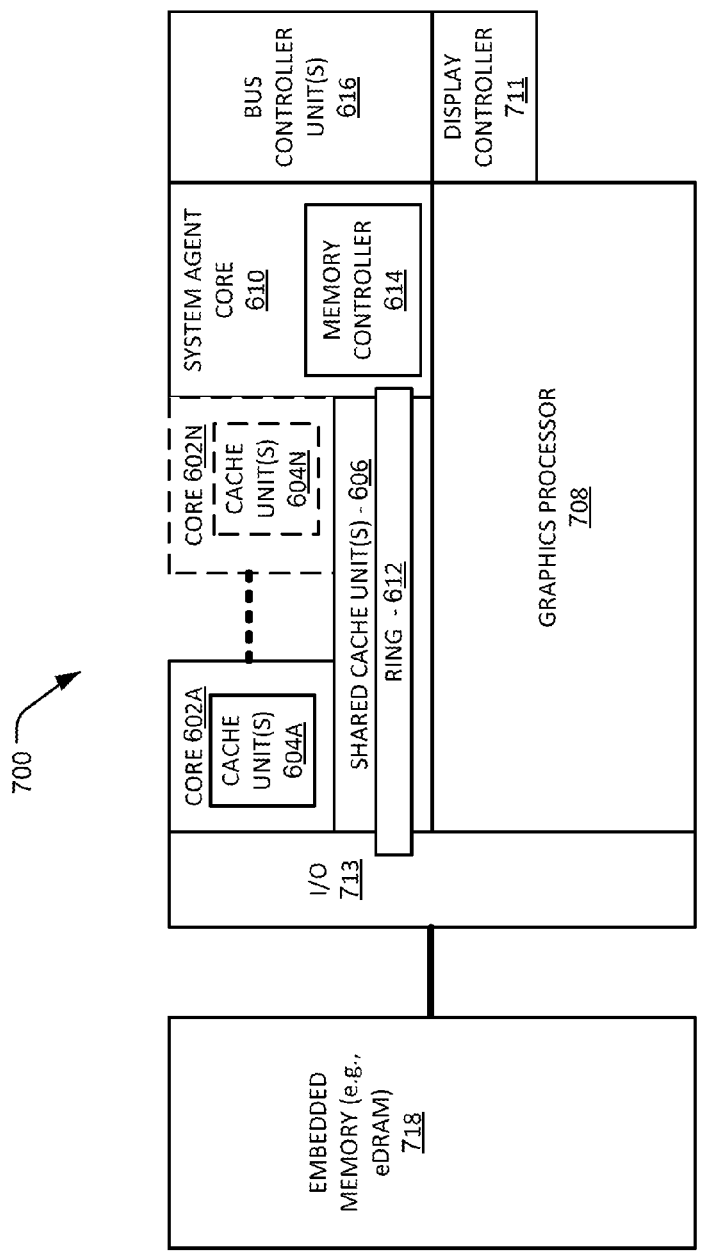
FIG. 7 is a block diagram of an embodiment of a processor having one or more processor cores, an integrated memory controller, and an integrated graphics processor.

FIG. 7 is a block diagram of an embodiment of a processor 700 having one or more processor cores 702A-N, an integrated memory controller 714, and an integrated graphics processor 708. The processor 700 can include additional cores up to and including additional core 702N represented by the dashed lined boxes. Each of the cores 702A-N includes one or more internal cache units 704A-N. In one embodiment each core also has access to one or more shared cached units 706.

The internal cache units 704A-N and shared cache units 706 represent a cache memory hierarchy within the processor 700. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 706 and 704A-N.

The processor 700 may also include a set of one or more bus controller units 716 and a system agent 710. The one or more bus controller units manage a set of peripheral buses, such as one or more Peripheral Component Interconnect buses (e.g., PCI, PCI Express). The system agent 710 provides management functionality for the various processor components. In one embodiment, the system agent 710 includes one or more integrated memory controllers 714 to manage access to various external memory devices (not shown).

In one embodiment, one or more of the cores 702A-N include support for simultaneous multi-threading. In such embodiment, the system agent 710 includes components for coordinating and operating cores 702A-N during multi-threaded processing. The system agent 710 may additionally include a power control unit (PCU), which includes logic and components to regulate the power state of the cores 702A-N and the graphics processor 708.

The processor 700 additionally includes a graphics processor 708 to execute graphics processing operations. In one embodiment, the graphics processor 708 couples with the set of shared cache units 706, and the system agent unit 710, including the one or more integrated memory controllers 714. In one embodiment, a display controller 711 is coupled with the graphics processor 708 to drive graphics processor output to one or more coupled displays. The display controller 711 may be separate module coupled with the graphics processor via at least one interconnect, or may be integrated within the graphics processor 708 or system agent 710.

In one embodiment a ring based interconnect unit 712 is used to couple the internal components of the processor 700, however an alternative interconnect unit may be used, such as a point to point interconnect, a switched interconnect, or other techniques, including techniques well known in the art. In one embodiment, the graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM module. In one embodiment each of the cores 702-N and the graphics processor 708 use the embedded memory modules 718 as shared last level cache.

In one embodiment cores 702A-N are homogenous cores executing the same instruction set architecture. In another embodiment, the cores 702A-N are heterogeneous in terms of instruction set architecture (ISA), where one or more of the cores 702A-N execute a first instruction set, while at least one of the other cores executes a subset of the first instruction set or a different instruction set.

The processor 700 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 700 can be implemented on one or more chips or as a system on a chip (SOC) integrated circuit having the illustrated components, in addition to other components.

Figure 8:
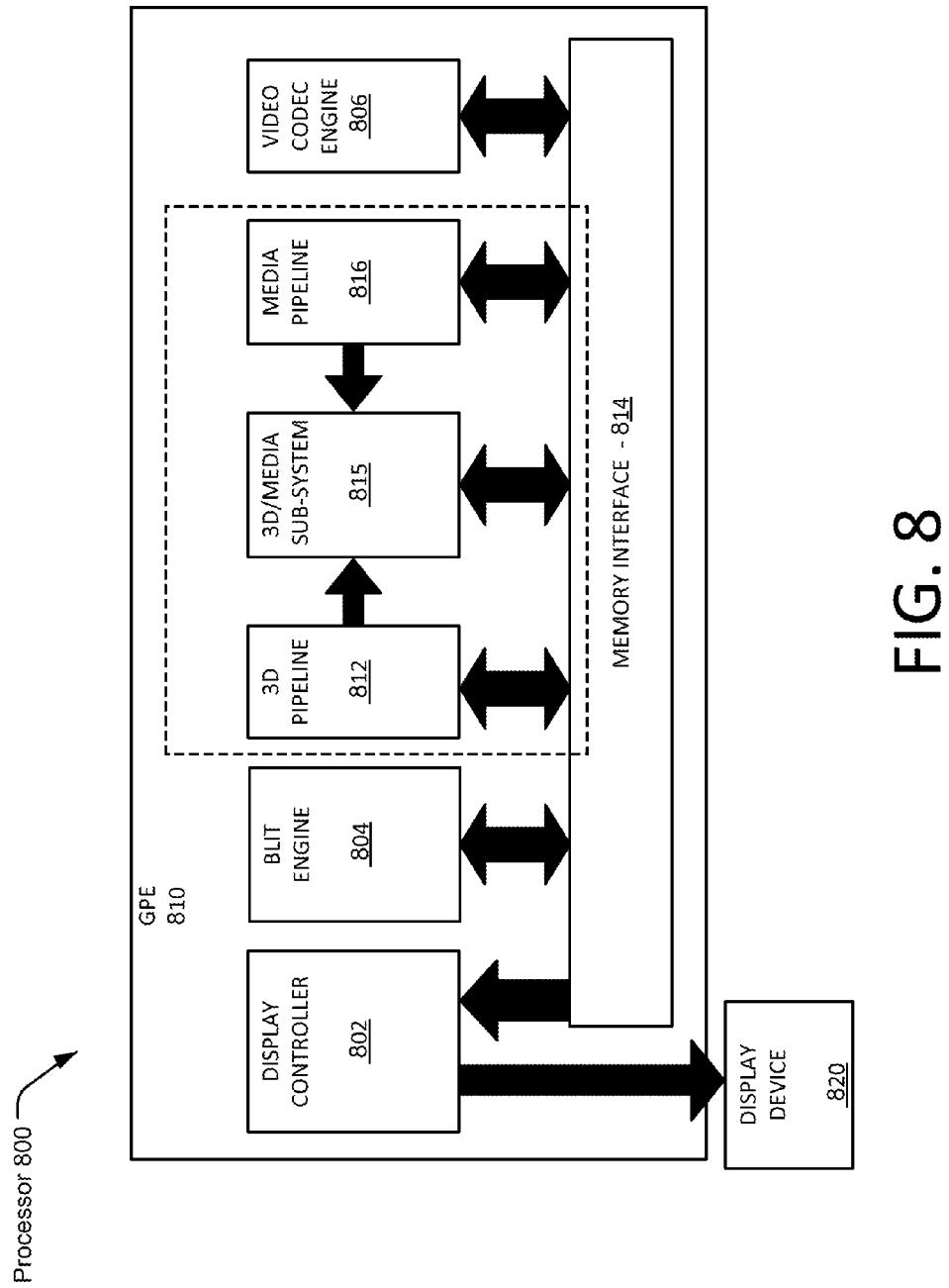
FIG. 8 is a block diagram of one embodiment of a graphics processor which may be a discreet graphics processing unit, or may be graphics processor integrated with a plurality of processing cores.

FIG. 8 is a block diagram of one embodiment of a graphics processor 800 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 800 includes a memory interface 814 to access memory. The memory interface 814 can be an interface to local memory, one or more internal caches, one or more shared external caches, and/or to system memory.

The graphics processor 800 also includes a display controller 802 to drive display output data to a display device 820. The display controller 802 includes hardware for one or more overlay planes for the display and composition of multiple layers of video or user interface elements. In one embodiment the graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 800 includes a block image transfer (BLIT) engine 804 to perform two-dimensional (2D) rasterizer operations including, for example, bit-boundary block transfers. However, in one embodiment, 2D graphics operations are performed using one or more components of the graphics-processing engine (GPE) 810. The graphics-processing engine 810 is a compute engine for performing graphics operations, including three-dimensional (3D) graphics operations and media operations.

The GPE 810 includes a 3D pipeline 812 for performing 3D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While the 3D pipeline 812 can be used to perform media operations, an embodiment of the GPE 810 also includes a media pipeline 816 that is specifically used to perform media operations, such as video post processing and image enhancement.

In one embodiment, the media pipeline 816 includes fixed function or programmable logic units to perform one or more specialized media operations, such as video decode acceleration, video de-interlacing, and video encode acceleration in place of, or on behalf of the video codec engine 806. In on embodiment, the media pipeline 816 additionally includes a thread spawning unit to spawn threads for execution on the 3D/Media sub-system 815. The spawned threads perform computations for the media operations on one or more graphics execution units included in the 3D/Media sub-system.

The 3D/Media subsystem 815 includes logic for executing threads spawned by the 3D pipeline 812 and media pipeline 816. In one embodiment, the pipelines send thread execution requests to the 3D/Media subsystem 815, which includes thread dispatch logic for arbitrating and dispatching the various requests to available thread execution resources. The execution resources include an array of graphics execution units to process the 3D and media threads. In one embodiment, the 3D/Media subsystem 815 includes one or more internal caches for thread instructions and data. In one embodiment, the subsystem also includes shared memory, including registers and addressable memory, to share data between threads and to store output data.

Figure 9:
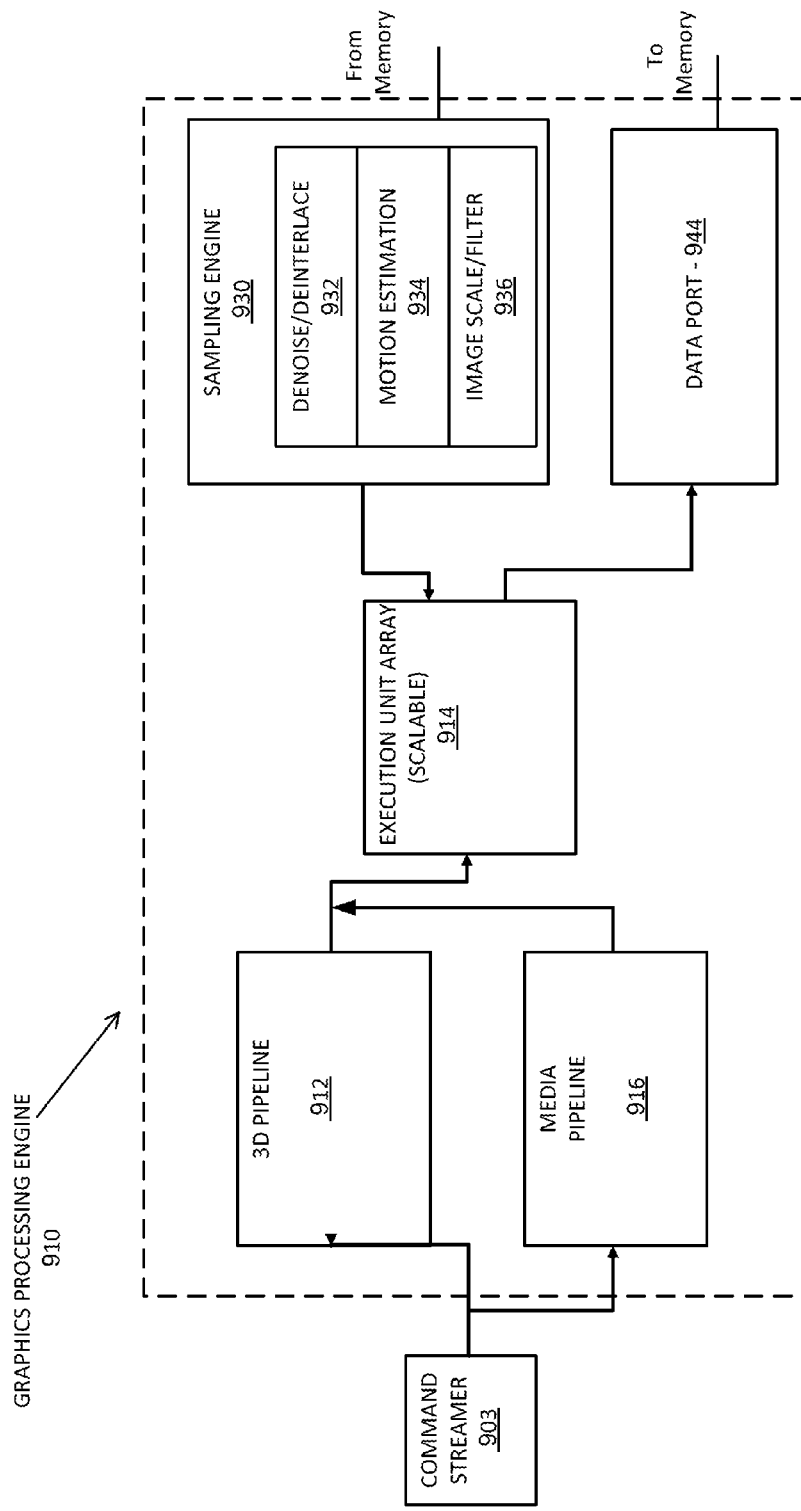
FIG. 9 is a block diagram of an embodiment of a graphics processing engine for a graphics processor.

FIG. 9 is a block diagram of an embodiment of a graphics processing engine 910 for a graphics processor. In one embodiment, the graphics processing engine (GPE) 910 is a version of the GPE 310 shown in FIG. 3. The GPE 910 includes a 3D pipeline 912 and a media pipeline 916, each of which can be either different from or similar to the implementations of the 3D pipeline 312 and the media pipeline 316 of FIG. 3.

In one embodiment, the GPE 910 couples with a command streamer 903, which provides a command stream to the GPE 3D and media pipelines 912, 916. The command streamer 903 is coupled to memory, which can be system memory, or one or more of internal cache memory and shared cache memory. The command streamer 903 receives commands from the memory and sends the commands to the 3D pipeline 912 and/or media pipeline 916. The 3D and media pipelines process the commands by performing operations via logic within the respective pipelines or by dispatching one or more execution threads to the execution unit array 914. In one embodiment, the execution unit array 914 is scalable, such that the array includes a variable number of execution units based on the target power and performance level of the GPE 910.

A sampling engine 930 couples with memory (e.g., cache memory or system memory) and the execution unit array 914. In one embodiment, the sampling engine 930 provides a memory access mechanism for the scalable execution unit array 914 that allows the execution array 914 to read graphics and media data from memory. In one embodiment, the sampling engine 930 includes logic to perform specialized image sampling operations for media.

The specialized media sampling logic in the sampling engine 930 includes a de-noise/de-interlace module 932, a motion estimation module 934, and an image scaling and filtering module 936. The de-noise/de-interlace module 932 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 932 includes dedicated motion detection logic (e.g., within the motion estimation engine 934).

The motion estimation engine 934 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 934 to perform operations on video at the macro-block level that may otherwise be computationally intensive to perform using a general-purpose processor. In one embodiment, the motion estimation engine 934 is generally available to graphics processor components to assist with video decode and processing functions that are sensitive or adaptive to the direction or magnitude of the motion within video data.

The image scaling and filtering module 936 performs image-processing operations to enhance the visual quality of generated images and video. In one embodiment, the scaling and filtering module 936 processes image and video data during the sampling operation before providing the data to the execution unit array 914.

In one embodiment, the graphics processing engine 910 includes a data port 944, which provides an additional mechanism for graphics subsystems to access memory. The data port 944 facilitates memory access for operations including render target writes, constant buffer reads, scratch memory space reads/writes, and media surface accesses. In one embodiment, the data port 944 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 914 communicate with the data port by exchanging messages via a data distribution interconnect that couples each of the sub-systems of the graphics processing engine 910.

Figure 10:
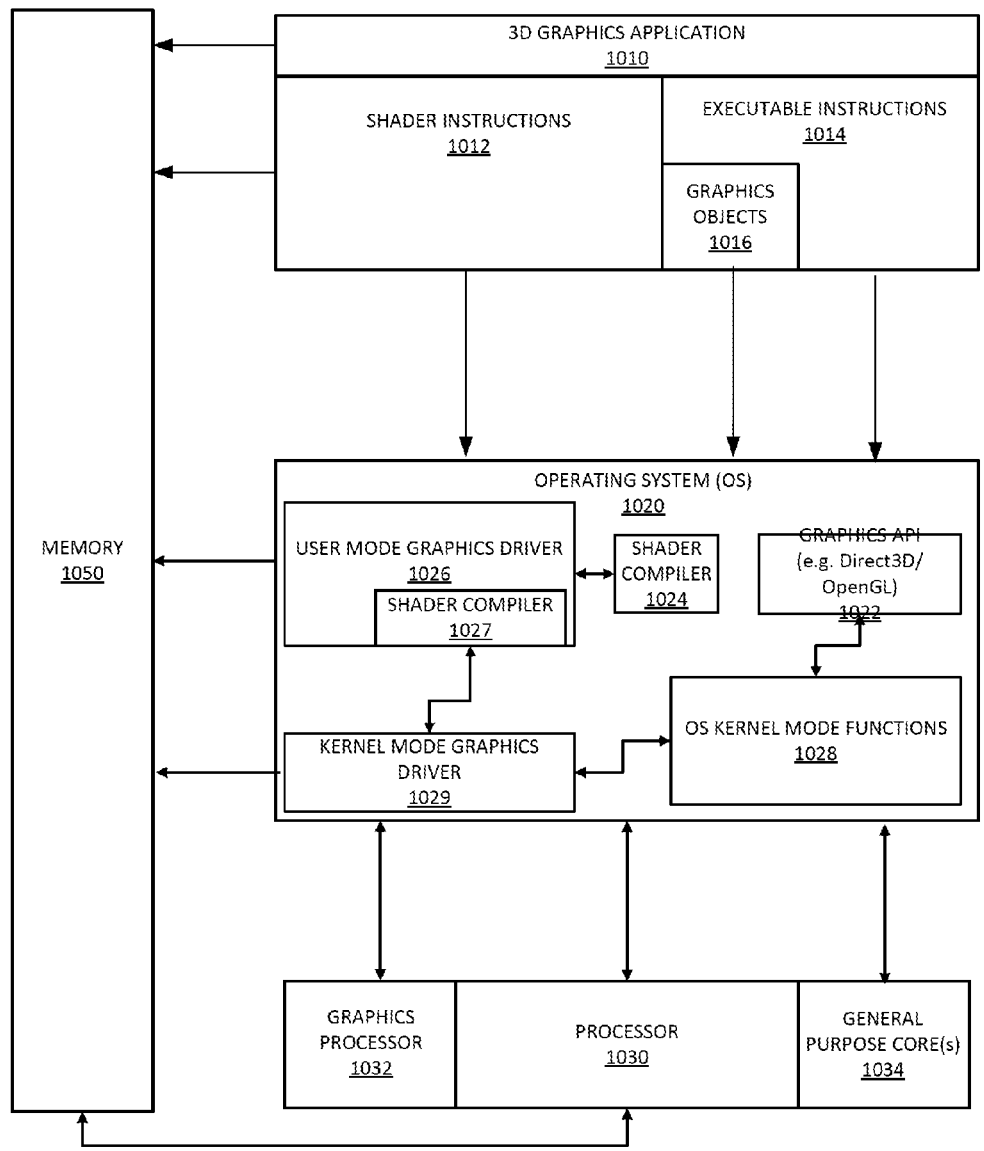
FIG. 10 illustrates exemplary graphics software architecture for a data processing system according to an embodiment.

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

Example 1 is a method of performing a pre-emption in graphics hardware, the method comprising: receiving and loading of at least two workloads; processing the at least two workloads; interrupting the processing of the at least two workloads by processing of a high priority workload; tracking an unreported or dropped workload due to the processing of the high priority workload; and determining whether a new workload is received and loaded, wherein the tracked unreported or dropped workload is re-queued after the new workload in response to the determination of receiving and loading of the new workload.

In Example 2, the method as recited in Example 1, wherein the workload is defined by a context identification (ID) number.

In Example 3, the method as recited in Example 1, wherein the at least two workloads are loaded in a submit queue register atomically.

In Example 4, the method as recited in Example 1, wherein the high priority workload is received, loaded and processed by the graphics hardware before the processing of the at least two workloads are completed.

In Example 5, the method as recited in Example 1, wherein the high priority workload is selected by a graphics scheduler from a list of high priority workloads.

In Example 6, the method as recited in Example 1, wherein the tracking the unreported or dropped workload is based from current contents of a hardware context status report.

In Example 7, the method as recited in Example 1, wherein the unreported or dropped workload includes at least one of the said at least two workloads.

In Example 8, the method as recited in Example 1, wherein in response to the determination of not receiving and loading the new workload, the tracked unreported or dropped workload is re-queued for processing in the graphics hardware.

Example 9 is a computing device comprising: one or more processors; a graphic scheduler coupled to the one or more processors, configured to perform scheduling operations; a graphic hardware coupled to the one or more processors, configured to receive and implement the scheduling operation, the graphic hardware further comprising: a submit queue register configured to receive and load at least two workloads; a hardware context status report configured to indicate a completed workload, a graphic engine configured to process the at least two workloads, wherein the scheduling operations includes processing of a high priority workload that interrupts the processing of the at least two workloads, wherein the graphic scheduler is further configured to track a dropped workload by comparing the completed workload with the workload in the submit queue register, wherein the tracked dropped workload is re-queued for processing.

In Example 10, the computing device as recited in Example 9, wherein the submit queue register further utilizes a head, a software head, and a tail to indicate submitted workload to the graphic engine for processing.

In Example 11, the computing device as recited in Example 9, wherein the workload that does not appears in the hardware context status report is deemed to be the tracked dropped workload.

In Example 12, the computing device as recited in Example 9, wherein the high priority workload is received, loaded, and processed by the graphics engine before the at least two workloads are completed.

In Example 13, the computing device as recited in Example 9, wherein the graphics scheduler is configured to select at least the high priority workload from a list of high priority workloads.

In Example 14, the computing device as recited in Example 9, wherein the dropped workload includes at least one of the said at least two workloads.

Example 15 is one or more computer-readable media storing processor-executable instructions that when executed cause one or more processors to implement a preemption in a graphics hardware comprising: receiving and loading at least two workloads; processing the at least two workloads; interrupting the processing of the at least two workloads by a processing of a high priority workload; tracking an unreported or dropped workload due to the interrupting based from current contents of a hardware context status report; and determining whether a new workload is received and loaded, wherein the tracked unreported or dropped workload is re-queued after the new workload in response to the determination of receiving and loading of the new workload.

In Example 16, the one or more computer-readable media as recited in Example 15, wherein the workload is defined by a context identification (ID) number.

In Example 17, the one or more computer-readable media as recited in Example 15, wherein the at least two workloads are loaded in a submit queue register atomically.

In Example 18, the one or more computer-readable media as recited in Example 15, wherein the high priority workload is received, loaded, and processed by the graphics hardware before the processing of the at least two workloads are completed.

In Example 19, the one or more computer-readable media as recited in Example 15, wherein the high priority workload is selected by a graphics scheduler from a list of high priority workloads.

In Example 20, the one or more computer-readable media as recited in Example 15, wherein the wherein the dropped workload includes at least one of the said at least two workloads.

What is claimed is:

1. A method of performing a pre-emption in graphics hardware, the method comprising:
   receiving and loading of at least two workloads;
   processing the at least two workloads;
   interrupting the processing of the at least two workloads by processing of a high priority workload;
   tracking an unreported or dropped workload due to the processing of the high priority workload, wherein the tracking includes treating one of said at least two workloads that does not appear in a hardware context status report as the unreported or dropped workload; and
   determining whether a new workload is received and loaded, wherein the tracked unreported or dropped workload is re-queued after the new workload in response to the determination of receiving and loading of the new workload.

2. The method as recited in claim 1, wherein the workload is defined by a context identification (ID) number.

3. The method as recited in claim 1, wherein the at least two workloads are loaded in a submit queue register atomically.

4. The method as recited in claim 1, wherein the high priority workload is received, loaded and processed by the graphics hardware before the processing of the at least two workloads are completed.

5. The method as recited in claim 1, wherein the high priority workload is selected by a graphics scheduler from a list of high priority workloads.

6. The method as recited in claim 1, wherein the tracking the unreported or dropped workload is based from current contents of the hardware context status report.

7. The method as recited in claim 6, wherein the currently contents include a completed workload.

8. The method as recited in claim 1, wherein in response to the determination of not receiving and loading the new workload, the tracked unreported or dropped workload is re-queued for processing in the graphics hardware.

9. A computing device comprising:
   one or more processors;
   a graphic scheduler coupled to the one or more processors, configured to perform scheduling operations;
   a graphic hardware coupled to the one or more processors, configured to receive and implement the scheduling operation, the graphic hardware further comprising:
      a submit queue register configured to receive and load at least two workloads;
      a hardware context status report configured to indicate a completed workload;
      a graphic engine configured to process the at least two workloads, wherein the scheduling operations includes processing of a high priority workload that interrupts the processing of the at least two workloads, wherein the graphic scheduler is further configured to track a dropped workload by comparing the completed workload with the workload in the submit queue register and in response to the comparing, treating the workload that does not appear in the hardware context status report to be the tracked dropped workload, wherein the tracked dropped workload is re-queued for processing.

10. The computing device as recited in claim 9, wherein the submit queue register further utilizes a head, a software head, and a tail to indicate submitted workload to the graphic engine for processing.

11. The computing device as recited in claim 9, wherein the high priority workload is received, loaded, and processed by the graphics engine before the at least two workloads are completed.

12. The computing device as recited in claim 9, wherein the graphics scheduler is configured to select at least the high priority workload from a list of high priority workloads.

13. The computing device as recited in claim 9, wherein the dropped workload includes at least one of the said at least two workloads.

14. One or more non-transitory computer-readable media storing processor-executable instructions that when executed cause one or more processors to implement a preemption in a graphics hardware comprising:
   receiving and loading at least two workloads;
   processing the at least two workloads;
   interrupting the processing of the at least two workloads by a processing of a high priority workload;
   tracking an unreported or dropped workload due to the interrupting based from current contents of a hardware context status report, wherein the one of said at least two workloads that does not appear in the hardware context status report is deemed to be the unreported or dropped workload; and
   determining whether a new workload is received and loaded, wherein the tracked unreported or dropped workload is re-queued after the new workload in response to the determination of receiving and loading of the new workload.

15. The one or more non-transitory computer-readable media as recited in claim 14, wherein the workload is defined by a context identification (ID) number.

16. The one or more non-transitory computer-readable media as recited in claim 14, wherein the at least two workloads are loaded in a submit queue register atomically.

17. The one or more non-transitory computer-readable media as recited in claim 14, wherein the high priority workload is received, loaded, and processed by the graphics hardware before the processing of the at least two workloads are completed.

18. The one or more non-transitory computer-readable media as recited in claim 14, wherein the high priority workload is selected by a graphics scheduler from a list of high priority workloads.

19. The one or more non-transitory computer-readable media as recited in claim 14, wherein the dropped workload is identified by a tail head in a submit queue register.

* * * * *